Sept. 12, 1933.  T. PALMER  1,926,815
MECHANISM AND PROCESS OF PRODUCING BUCKRAM
Original Filed Aug. 1, 1925  2 Sheets-Sheet 1.
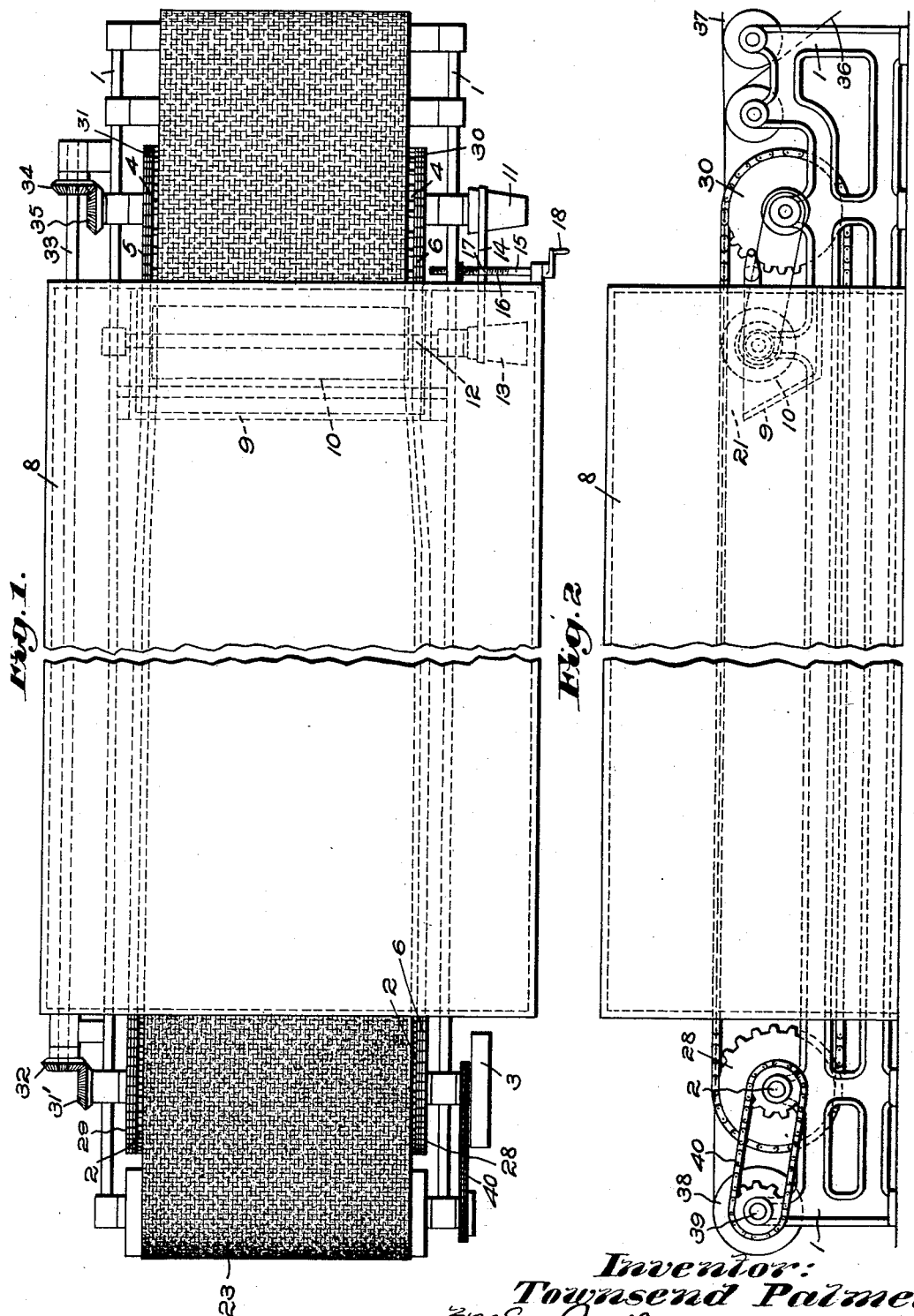
Inventor:
Townsend Palmer,
by Emery, Booth, Janney and Varney
Att'ys Sept. 12, 1933.                T. PALMER                1,926,815
           MECHANISM AND PROCESS OF PRODUCING BUCKRAM
               Original Filed Aug. 1, 1925    2 Sheets-Sheet 2
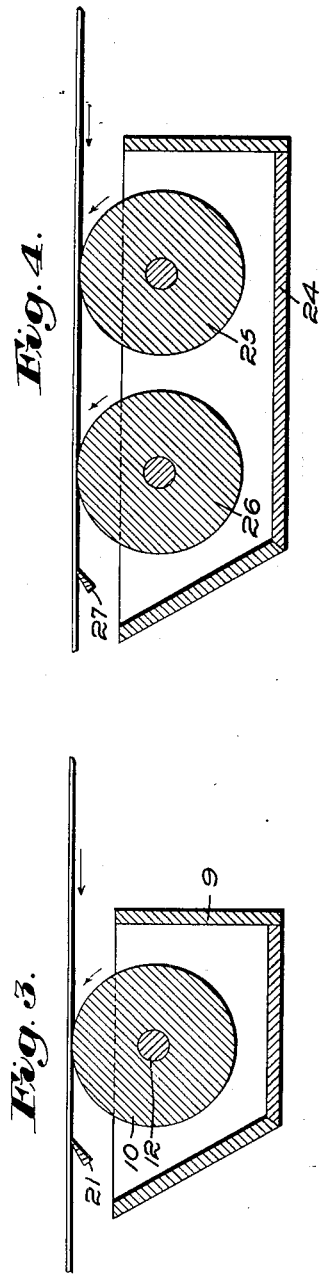
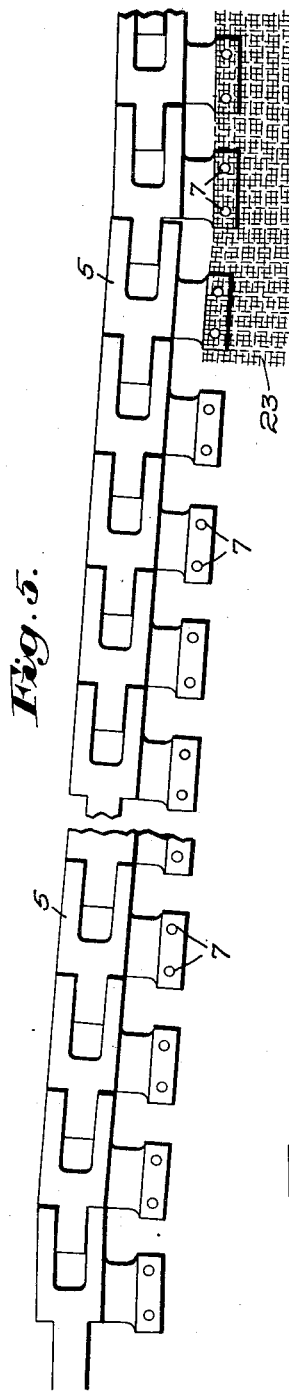
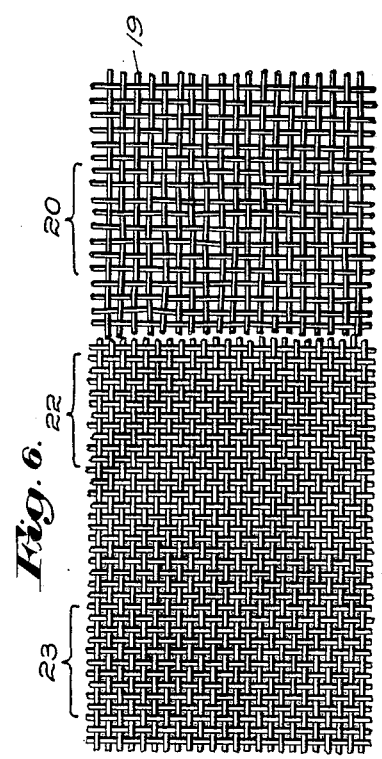
Inventor:
Townsend Palmer.

Patented Sept. 12, 1933

1,926,815

UNITED STATES PATENT OFFICE 1,926,815

MECHANISM AND PROCESS OF PRODUCING BUCKRAM

Townsend Palmer, Middletown, Conn.

Refiled for abandoned application Serial No. 47,479, August 1, 1925. This application November 5, 1928. Serial No. 317,236

17 Claims. (Cl. 154—37)

This application contains subject matter disclosed in my co-pending application, Serial No. 47,479, filed August 1, 1925, and abandoned on November 5, 1928, and is in substance a refiling thereof.

This invention relates to mechanism for and process of producing plural ply, woven fabrics, and particularly relates to mechanism for and process of producing plural ply buckram, such, for example, as millinery buckram and like material.

In order that the principle of the invention may be readily understood, I have in the accompanying drawings disclosed one form of means or mechanism of my invention by which my process may be practised.

In the drawings:

Fig. 1 is a plan view, parts being broken away, of mechanism or apparatus whereby plural ply fabrics of the general character hereinbefore specified, and particularly whereby millinery buckram or the like, may be made in accordance with my invention and by which my process may be practised;

Fig. 2 is a side elevation of the mechanism or apparatus shown in Fig. 1;

Fig. 3 is a detail in vertical section showing one form of means for applying the starch-like material to the layers of the fabric;

Fig. 4 is a similar view of a slight modification;

Fig. 5 is a detail in plan representing a portion of one of the chains by which the material is stretched and conveyed through the drying structure or housing; and Fig. 6 is a plan view showing a portion of two layers of woven material from which the said buckram or like fabric is made.

My invention is or may be applicable to the manufacture of plural ply fabrics. It is more especially applicable to the manufacture of plural ply fabrics made up of sheets of woven material, which may be of the same or different mesh, count or description. If desired, as herein disclosed more in detail, the meshes of one of said sheets may be finer than those of the other or of another of any suitable plurality of sheets employed.

Without in any way limiting my invention thereto and simply as a selected embodiment of my invention as to method and apparatus, I will more particularly describe the same as applied to the manufacture of so-called millinery buckram. My invention may be applied to certain other buckrams not necessary to refer to.

Buckram of the general character of millinery buckram may be made by superimposing one woven sheet or piece of suitable mesh fabric upon another similarly woven piece of suitable mesh, and while the same are in a substantially taut condition manually applying some suitable starch-like coalescent or adherent material by which the two layers are caused to adhere during the drying process.

An important purpose of my invention is to provide a mechanism whereby millinery buckram or other buckram and like fabrics may be manufactured more expeditiously and by a process which is carried out mechanically and desirably in an automatic manner. It is, however, to be understood that the invention in its application is not necessarily limited to the production of any of said specified fabrics, nor to the use of open-mesh woven fabrics. The mesh, count, or description of each of the sheets is what is found to be best suited for the specific purpose in hand.

In the accompanying drawings, I have disclosed one form of mechanism by which such results may be secured, and I will describe the same in detail, but without limiting myself to the disclosed mechanism, which is shown for purposes of explanation merely.

I may, in practising my inventing, employ a tentering machine of any suitable type or any other mechanism by which the material may be suitably conveyed and dried.

Therefore, without limiting myself thereto, I will disclose with sufficient detail one form of tentering machine.

In tentering machines as now constructed, the edges of the fabric are received either by clamps or are impaled upon pins of travelling and preferably chain-like conveyers.

For the purpose of this disclosure, I have represented the latter type of apparatus, and to that end I have shown, in Figs. 1 and 2, a portion 1 of the framing whereon is mounted a drive shaft 2 having a driving pulley 3 at the left hand of the mechanism or apparatus viewing Figs. 1 and 2, and a second shaft 4 at the right hand of the mechanism or apparatus viewing said figures.

Supported upon said shafts, which may be placed any suitable distance apart, are two sprocket chains or conveyers 5, 6, one of which is shown enlarged in Fig. 5. Said sprocket chains or conveyers are, as clearly shown in Fig. 5, provided with pins 7 upon which the plurality of layers of fabric, of any suitable or desired character, may be impaled as said sprocket chains or conveyers move forward. I provide a suitable housing 8 of any suitable length and adapted to receive the entering material which therein may be heated, in any customary or other manner, to the desired temperature. The housing should be of such length that the fabric is properly dried during the passage of the material therethrough at some suitable rate, as, for example, three yards per minute. The fabric material may be of any suitable width, as, for example, six feet or any other desired width, and the housing is of sufficient width to permit the reception thereof, whatever the width of the entering material. The woven fabric of the selected mesh is rendered and maintained laterally taut during its passage through the housing 8, and if desired such tautening action may commence before the material enters the housing. For this purpose, any suitable construction may be provided, but desirably the two sprocket chains or conveyers are so supported that during a portion at least of their travel they diverge in the direction of travel, as clearly indicated in Figs. 1 and 5.

After extensive experimentation, I have ascertained that the most satisfactory results are secured by applying the starch-like or other material, which I may refer to as a coalescent or adherent material, to the under side of the two or more layers of material. Especially is it desirable to do this in the event that one of said fabrics is of coarser mesh than the other or others. In such case, I desirably so introduce the said fabrics as to have the more coarsely woven fabric or material or layer underneath. This is especially the case with buckram composed of finer and coarser layers respectively. Among the classes of buckram to which my invention is particularly applicable, I may refer to what is known as "Jockey" buckram made of two pieces of fine mesh cloth of the same count and description. If buckram be made of a coarser and a fine layer or sheet, it may be desirable under certain conditions, to apply the coalescent material directly to the finer layer or sheet which, in that case, is desirably underneath.

While I herein employ such terms as "open mesh fabric" and "more coarsely woven material", it is to be understood that either one or both fabrics (or all, if more than two be employed) may be of any suitable coarse and/or fine mesh.

The coalescent coating material may be applied at any suitable points, and within the scope of my invention either exterior to the entrance end of the housing 8 or within the housing.

I have, however, represented the coalescent material-applying mechanism as within the housing, though in certain cases I prefer to apply the coalescent material in advance of (i. e. prior to) the entrance end of the housing.

For the purpose, I provide a receptacle 9 of any suitable shape, but of sufficient width to receive a roll 10 of the full width of the fabric, as clearly indicated in Fig. 1. Such roll is shown as smooth. It is of any suitable character rendering it capable of conveying the sizing or other coalescent or adherent material up to the fabrics being treated, and may be of any suitable material. While said roll 10 may be rotated by hand, it is preferably mechanically rotated, and desirably is rotated in the direction of travel of the woven material, and also desirably at a somewhat faster speed than the speed of travel of the said material, though the invention as to these features is not limited in this respect. To permit of this, and for other reasons, I provide means for varying the speed of the roll in relation to the speed of the woven material.

In the course of my experimentation I have found that the results vary with the relative speed of the roll 10. While any suitable speed controlling means may be provided, I have in Fig. 1 represented the shaft 4 as having thereon a cone pulley 11, and upon the shaft 12 of the roll 10 is provided an oppositely positioned cone pulley 13. A belt 14 passes about both said cone pulleys, and I have provided a shaft 15 suitably threaded at 16 into the framing and provided with a guide 17 for the belt 14, so that said belt may be shifted lengthwise the cone pulleys and the speed of the roll 10 may be thereby varied. By means of the handle 18, a great nicety of adjustment or change of speed may be secured.

The coalescent or adherent material is placed in the receptacle 9, and in the rotation of the roll 10 a thin film thereof is supplied to the meshes 19 of the underlying layer 20, and the excess material is removed therefrom by one or more doctors or scrapers 21 supported in position in any suitable manner.

In Fig. 6, I have represented at the right a portion of the lowermost fabric, which is here represented as of open mesh and coarser than the overlying fabric which is here shown as of finer mesh, though within the scope of the invention, as already stated, the meshes of the fabric may be whatever is best suited to the particular result desired. Overlying the layer 20 is a portion 22 of fabric here shown as of finer mesh. At 23 I have indicated a portion of the superposed fabrics as they appear after the application thereto of the coalescent or adherent material.

It will be understood that the material is applied to the under side of the lower layer of fabric, herein disclosed as the coarser, but that said coalescent or adherent material works its way through the said fabric and fills the interstices of the overlying fabric or fabrics and causes the same to adhere, so that they become a unitary piece not capable of ready separation.

While I have referred specifically to two layers of material, it is obvious that three layers may be provided, a number in excess of three not being desirable under ordinary conditions, though my invention is not limited to three as the greatest number that may be employed. In the event that more than two layers of material are employed, the meshes thereof may be of the character hereinbefore stated. For example, the underlying layer may be of coarse mesh, one of the overlying layers may be of finer mesh, and the other overlying layer may be of still finer mesh, or both of the overlying layers may be of the same mesh, but finer than the underlying layer. Other dispositions of layers as respects the character of the meshes thereof may be resorted to within the scope and practice of my invention.

If desired, I may provide a plurality of rolls or other means for conveying the coalescent or adherent material to the fabric, and in Fig. 4 I have represented a slight modification wherein the receptacle 24 is provided with two rolls 25, 26, each of which conveys a film of the said material to the fabric, and the excess coalescent material is removed therefrom by one or more doctors or scrapers 27.

Any suitable means may be provided for supporting the two quantities of fabric in such way that they may be positively drawn through the housing 8, and any other suitable means may be provided for driving the moving parts. I have here shown for the purpose the main driving shaft 2 as receiving thereon sprockets 28, 29 for the sprocket chains or conveyers, and similar sprocket 30, 31 are provided upon the shaft 4. Upon shaft 2 is provided a beveled gear 31' meshing with and driving the beveled gear 32 upon a shaft 33 extending entirely through the housing and which may have fast upon its opposite end a beveled gear 34 meshing with and driving a beveled gear 35 upon the shaft 4. Any other suitable driving means may be provided, as, for example, one which positively drives only the sprockets 28, 29, the sprockets at the receiving end acting primarily as supports for the endless chains, and being rotated thereby.

In the preferred embodiment of the invention, the sheets or layers conveyed through the housing are not delivered thereto from rolls. Said sheets or layers receive a preliminary starching wet, and go into the tentering machine wet, being drawn out from boxes or other receptacles into which they have been run from the starch mangle. Within the scope and purpose of my invention, the sheets or layers may be supported in roll form, but herein I have represented at 36 and at 37 the two sheets as broken away, it being understood that they are introduced from any suitable place, receptacle or support.

As shown most clearly in Figs. 1 and 2, the underlying fabric, herein disclosed as the coarser (merely for illustrating the selected embodiment of my invention) is delivered as indicated at 36 and the overlying fabric, herein disclosed as the finer (being merely so disclosed in the selected embodiment of the invention), is delivered as indicated at 37.

They are drawn by the conveyers in such manner as to be conjointly wound as buckram in a roll 38. The said roll 38 is shown as supported upon a shaft 39 in the framing and is driven in any suitable manner, as by a sprocket chain 40 from the main drive shaft 2, means being provided to permit said roll 38 to travel at a uniform surface speed, notwithstanding the increase in diameter of the roll as the fabric accumulates. It is evident that the higher the speed of the roll 10 or of the rolls 25, 26 relative to the travel of the goods, the more coalescent or adherent material is applied to the goods and is retained thereby. Said material may be of any suitable character, and my invention is in no wise limited in this respect.

It is to be understood that my invention is in no wise limited to the use of an open-mesh fabric or open-mesh fabrics. My invention, relating, as it does, to the manufacture of plural ply buckram and like material, may be practised with woven fabrics regardless of the count or character of the mesh thereof.

Having thus described one embodiment of means for carrying out my invention and the best mode known to me for practising the process of my invention, I desire it to be understood that although specific terms are employed, they are used in a generic and descriptive sense and not for purposes of limitation, the scope of the invention being set forth in the following claims.

I claim

1. Apparatus for making plural ply, woven fabrics of fibrous material, such as millinery buckram and the like, including in combination, means for conveying and drying a plurality of superimposed pieces of woven fibrous material, and means for applying coalescent or adherent material directly to the under face of the underlying piece of said material, whereby to cause the adherence of said superimposed pieces into said millinery buckram and the like.

2. That process of making plural ply, woven fabrics of fibrous material, such as millinery buckram and the like, including conveying and drying a plurality of superimposed fabrics of woven, fibrous material, and mechanically applying a film of coating or coalescent material to the under side of the superimposed pieces of material, whereby to cause the adherence of said superimposed pieces into said millinery buckram and the like.

3. Apparatus for making plural ply, woven fabrics of fibrous material, such as millinery buckram and the like, including in combination, means for conveying and drying a plurality of superimposed pieces of woven, fibrous material, and means for applying coalescent or adherent material directly to a face of the said material while the pieces are superimposed, whereby to cause the adherence of said superimposed pieces into said millinery buckram and the like.

4. Apparatus for making plural ply, woven fabrics such as millinery buckram and the like, including in combination, means for conveying and drying a plurality of superimposed pieces of woven fabric material of different counts or mesh, and means for applying coalescent or adherent material directly to the under face of the underlying piece of said material, whereby to cause the adherence of said superimposed pieces into said millinery buckram and the like.

5. Apparatus for making plural ply, woven fabrics, such as millinery buckram and the like, including in combination, means for conveying and drying a plurality of superimposed pieces of woven fabric material of different counts and mesh, means for conveying coalescent or adherent material to said pieces of fabric, whereby to cause adherence of said superimposed pieces into said millinery buckram and the like, and means for driving said applying means at a speed in excess of the travel of said pieces of fabric material.

6. That process of making plural ply, woven fabrics such as millinery buckram and the like including conveying and drying a plurality of superimposed woven fabrics of different counts or mesh, and mechanically applying a film or coating of coalescent material to the under side of the superimposed pieces of material, whereby to cause the adherence of said superimposed pieces into said millinery buckram and the like.

7. Apparatus for making plural ply, woven fabrics, such as millinery buckram and the like, including in combination, means for conveying and drying a plurality of superimposed pieces of open mesh, woven fabric material, and means for applying coalescent or adherent material directly to the under face of the underlying piece of said material, whereby to cause the adherence of said superimposed pieces into said millinery buckram and the like.

8. Apparatus for making plural ply, woven fabrics such as millinery buckram and the like, including in combination, means for conveying and drying a plurality of superimposed pieces of open mesh, woven fabric material, means for conveying coalescent or adherent material to said pieces of fabric, whereby to cause adherence of said superimposed pieces into said millinery buckram and the like, and means for driving said applying means at a speed in excess of the travel of said pieces of fabric material.

9. Apparatus for making plural ply, woven fabrics, such as millinery buckram and the like, including in combination, means for conveying and drying a plurality of superimposed pieces of open mesh, woven fabric material, whereby to cause the adherence of said superimposed pieces into said millinery buckram and the like, a roll for applying coalescent or adherent material to said fabric, and means for rotating said roll in the direction of travel of said textile material.

10. Apparatus for making plural ply, woven fabrics, such as millinery buckram and the like, including in combination, means for conveying and drying a plurality of superimposed pieces of open mesh, woven fabric material, and a roll for applying coalescent or adherent materal directly to the under side of said fabric material, whereby to cause the adherence of said superimposed pieces into said millinery buckram and the like.

11. Apparatus for making plural ply, woven fabrics, such as millinery buckram and the like, including in combination, means for conveying and drying a plurality of superimposed pieces of open mesh, woven fabric material, a roll for applying coalescent or adherent material directly to the under side of said fabric material, whereby to cause the adherence of said superimposed pieces into said millinery buckram and the like, and means for rotating said roll at a greater speed than the speed of travel of the textile material.

12. Apparatus for making plural ply, woven fabrics, such as millinery buckram and the like including in combination, means for conveying and drying a plurality of superimposed pieces of open mesh, woven fabric material, a roll for applying coalescent or adherent material directly to the under side of said fabric material, whereby to cause the adherence of said superimposed pieces into said millinery buckram and the like, and means for varying the surface speed of the roll with respect to the speed of travel of the textile material.

13. Apparatus for making plural ply, woven fabrics, such as millinery buckram and the like, including in combination, means for conveying and drying a plurality of superimposed pieces of open-mesh, woven fabric material, and including means to prevent relative movement of said pieces of material, and means for applying a film of coalescent or adherent material directly to the under surface of the lowermost piece of material in such manner as to fill the interstices of the fabric material, whereby to cause the adherence of said superimposed pieces into said millinery buckram and the like.

14. Apparatus for making plural ply, woven fabrics, such as millinery buckram and the like, including in combination, means for conveying and drying a plurality of superimposed pieces of open mesh, woven material, whereof the underlying piece is the coarser, and means for applying a film of coalescent or adherent material directly to the coarser fabric, whereby to cause the adherence of said superimposed pieces into said millinery buckram and the like.

15. That process of making plural ply, woven fabrics, such as millinery buckram or the like, including conveying and drying a plurality of superimposed, open mesh, woven fabrics, and mechanically applying a film or coating of coalescent material to the under side of the superimposed pieces of material, whereby to cause the adherence of said superimposed pieces into said millinery buckram and the like.

16. That process of making plural ply, woven fabrics, such as millinery buckram or the like, including conveying and drying a plurality of superimposed, open mesh, woven fabrics, and mechanically applying a film or coating of coalescent material to the under side of the superimposed pieces of material and applying said material at a faster rate than the speed of travel of the woven material, whereby to cause the adherence of said superimposed pieces into said millinery buckram and the like.

17. Apparatus for making plural ply, woven fabrics, such as millinery buckram or the like, including in combination, means for conveying and drying a plurality of superimposed pieces of fabric material in lengths, means for confining said lengths against relative movement while superimposed, and means for applying a film of coalescent or adherent material to the under face of the lowermost piece as superimposed, thereby permitting the same to fill the interstices of said superimposed pieces, whereby to cause the adherence of said superimposed pieces into said millinery buckram and the like.

TOWNSEND PALMER.